A. H. BATES.
RIBBON FEEDING MECHANISM.
APPLICATION FILED FEB. 20, 1908.

991,599.

Patented May 9, 1911.
4 SHEETS—SHEET 1.

WITNESSES:
Arthur S. Remsberg.
Brennan B. West.

INVENTOR,
Albert H. Bates.
BY Baker, Fouts & Hull
ATTYS.

A. H. BATES.
RIBBON FEEDING MECHANISM.
APPLICATION FILED FEB. 20, 1908.

991,599.

Patented May 9, 1911.

4 SHEETS—SHEET 2.

WITNESSES:
Arthur S. Remsberg.
Brennan B. West.

INVENTOR,
Albert H. Bates.
By Bates, Fouts & Hull,
ATTYS.

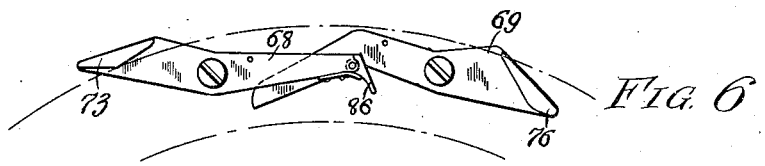
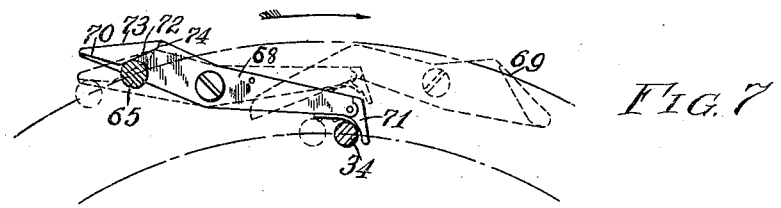
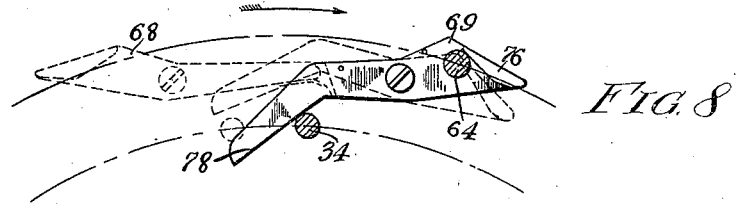
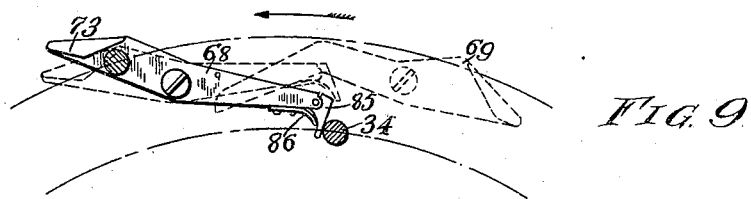
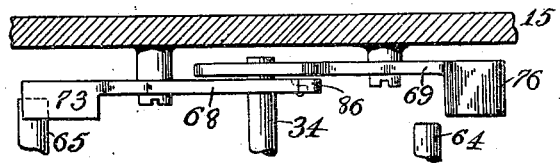

A. H. BATES.
RIBBON FEEDING MECHANISM.
APPLICATION FILED FEB. 20, 1908.

991,599.

Patented May 9, 1911.
4 SHEETS—SHEET 4.

WITNESSES:
Arthur S. Remsberg.
Brennan B. West.

INVENTOR,
Albert H. Bates.
BY Bates, Fouts & Hull,
ATTYS.

UNITED STATES PATENT OFFICE.

ALBERT H. BATES, OF CLEVELAND, OHIO, ASSIGNOR TO THE AMERICAN MULTIGRAPH COMPANY, OF CLEVELAND, OHIO, A CORPORATION OF OHIO.

RIBBON-FEEDING MECHANISM.

991,599.  Specification of Letters Patent.  Patented May 9, 1911.

Original application filed November 9, 1907, Serial No. 401,425. Divided and this application filed February 20, 1908. Serial No. 416,809.

*To all whom it may concern:*

Be it known that I, ALBERT H. BATES, a citizen of the United States, residing at Cleveland, in the county of Cuyahoga and State of Ohio, have invented a certain new and useful Improvement in Ribbon-Feeding Mechanism, of which the following is a full, clear, and exact description, reference being had to the accompanying drawings.

The object of this invention is to provide simple and efficient mechanism for automatically reversing the direction of feed of a ribbon.

It is adapted for use with various sorts of ribbon printing mechanism.

The invention is shown herein as combined with a printing machine of the type known as the "multigraph," wherein there is a rotary drum carrying a page form of type and carrying in a recess a pair of spools on which the ends of the ribbon are mounted, the ribbon intermediately passing around the surface of the drum. Such combination is covered by my application Serial No. 401,425, filed November 9th, 1907, of which the present application is a division; the present invention not being concerned with the mechanism with which the ribbon mechanism coöperates. The specific form of device shown for driving one spool or the other is that now on the multigraph and is not my invention.

My invention provides mechanism within the ribbon spool which is operated by the pull on the ribbon when the spool becomes empty, this mechanism coöperating with other mechanism to cause the shifting of the ribbon feed mechanism from one spool to the other, whether such ribbon feed mechanism is of the type shown or of other style.

Figure 1:
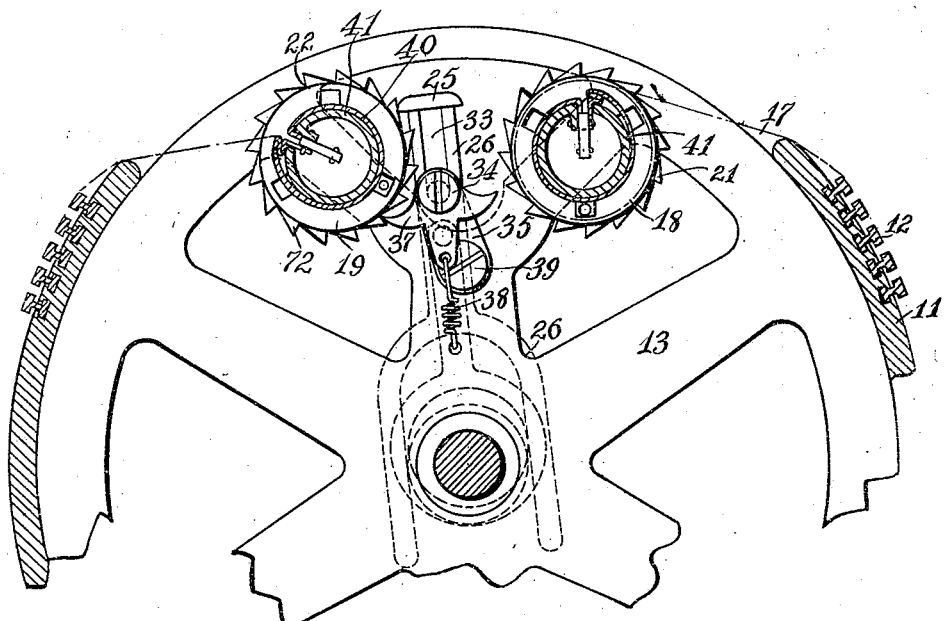
Figure 2:
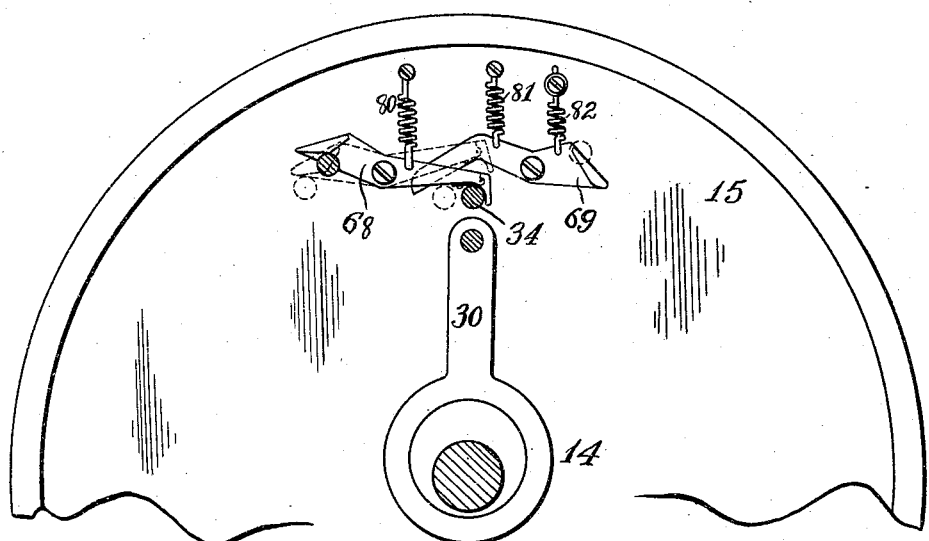
Figure 3:
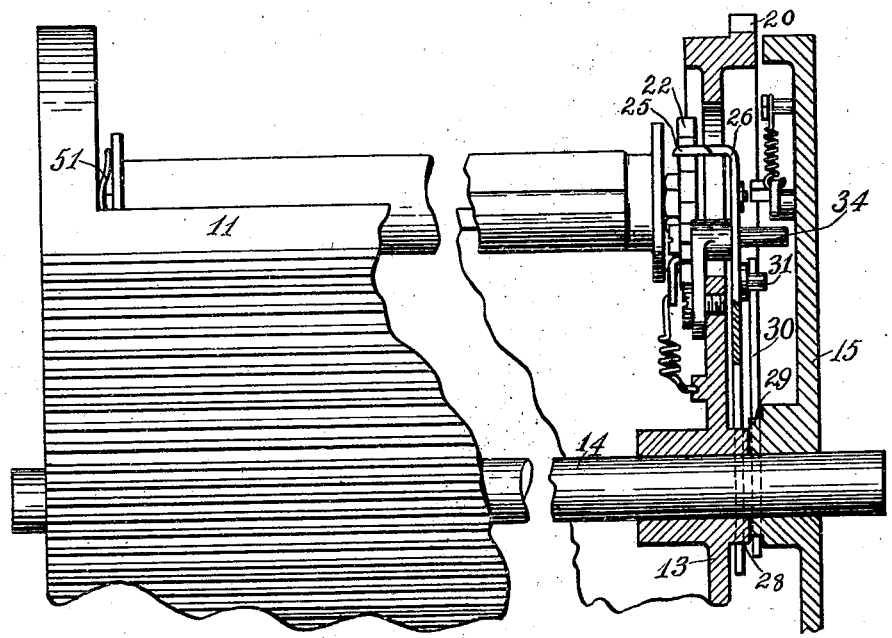
Figure 4:
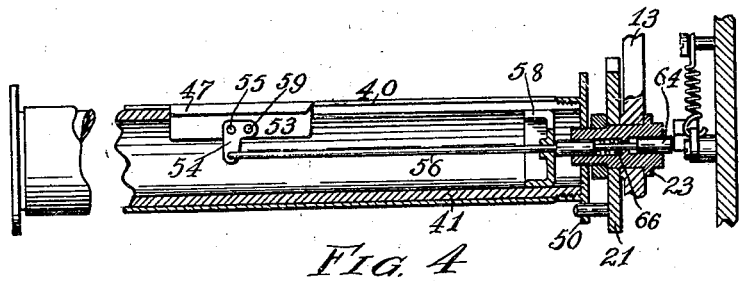
Figure 5:
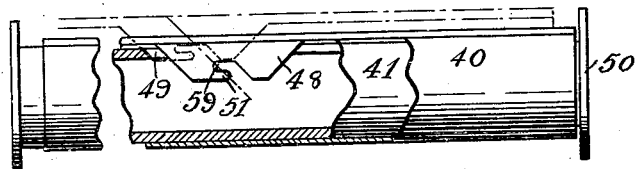
Figure 11:
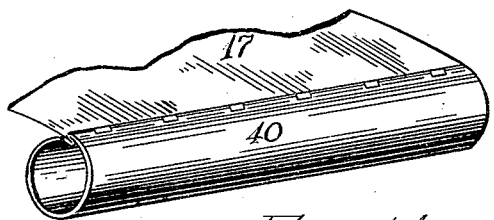
Figure 12:
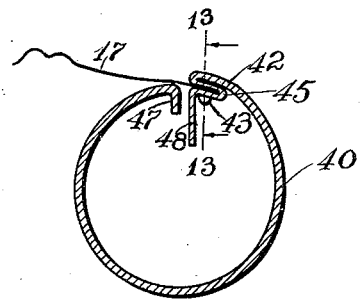
Figure 13:
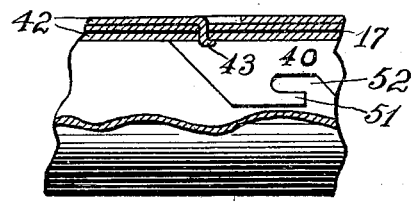

In the drawings, Figure 1 is a vertical section through a portion of a multigraph printing drum, such as is shown for example in Reissue Patent No. 12,622, issued November 19th, 1907, to H. C. Gammeter, and his application No. 298,122 filed January 27th, 1906. Fig. 2 is an elevation of the frame member adjacent to the right hand end of the printing drum. Fig. 3 is a sectional side elevation of the drum. Fig. 4 is a longitudinal section through one of the ribbon spools and through the coöperating mechanism at the right hand end of the spool. Fig. 5 is a side elevation partly broken away, showing the spool with the ribbon clamp. Figs. 6 to 10 show the levers which shift the ribbon feeding device and appear in smaller scale in Fig. 2,—Fig. 6 being a view of such levers in their normal position; Fig. 7 a view when the rearmost spool has become empty and the shifting is taking place, Fig. 8 a view when the forward spool has become empty and the shifting is taking place in that direction, Fig. 9 a view showing the parts in an abnormal position they might have under certain circumstances if the drum were rotated backward, and Fig. 10 showing these levers in plan. Fig. 11 is a perspective of the tubular clamping member on the end of the ribbon, Fig. 12 is an enlarged cross section of the same, and Fig. 13 is a fragmentary longitudinal section, as indicated by the line 13—13 of Fig. 12.

Referring to the parts by reference numerals, 11 represents a printing drum which has on its surface longitudinal rails 12 providing grooves for carrying lines of type. The drum surface is mounted on spiders 13 secured to a shaft 14. This shaft is suitably mounted, the mounting at the left hand end being omitted in Fig. 3, and that at the right hand end being in the frame member 15. Suitable means, not shown, operates on the shaft to rotate the drum. The type carried on the surface of the drum are inked by a suitable ribbon 17 extending around the drum and having its ends carried on spools 18 and 19 mounted in a recess in the drum. Coöperating with the drum is a suitable platen, not shown, which may be driven by a gear 20 on the periphery of the spider 13. This part of the construction is the usual multigraph movement.

To provide mechanism for feeding the ribbon as the drum is rotated to bring a fresh face to the type, I arrange the spools to engage at their right hand ends ratchet wheels 21 and 22 which are loosely mounted on studs 23 carried by the spider 13. Either ratchet wheel is adapted to be engaged and operated by the double faced pawl or shoulder 25, carried by the bar 26. This bar is forked at its lower end and straddles a boss 28 on the hub of the spider. Adjacent to this boss is a stationary eccentric 29 formed on an inward boss on the end frame member 15. This eccentric takes a strap 30 which is connected by a pin 31 with the bar 26.

The result of the above described construction is that as the drum rotates the eccentric strap feeds the bar 26 in and out, causing it to engage one ratchet wheel or the other according to the position of the bar. The bar 26 is guided above by a slot 33 therein through which extends a pin 34 projecting from a short lever 35 pivoted to the spider 13. Loosely mounted on this pin on the other side of the lever 35 is the double faced detent pawl 37, which has teeth adapted to engage either ratchet and has an inwardly extending arm to which is connected a spring 38 anchored to the spider between the shaft and the pivot pin 39 of the arm 35. Now, when the bar 26 is on one extreme position as shown in Fig. 1, for example, the spring not only holds the pin 34 so that as the bar feeds up and down it will engage the ratchet wheel 22, but also holds the detent pawl 37 in engagement with that wheel. The mechanism accordingly operates to rotate that wheel to the exclusion of the other, which is free to allow its spool to unwind. When, however, it is desired to rotate the other ratchet to wind in the other spool, the bar 26 is shifted from the position shown in Fig. 1 into corresponding engagement with the ratchet wheel 21. In this position, the other face of the pawl 25 coöperates with the teeth of the wheel 21 and the other face of the detent pawl 37 holds that wheel against return. In either working position of the bar 26, the spring 38 maintains such position until sufficient force is applied to the bar to swing the pivot 34 over the dead center, whereupon the contraction of the spring carries the parts into engagement with the other ratchet. The ribbon feeding mechanism described is the invention of H. C. Gammeter, being covered in his application No. 298,122, where it is shown reversible by hand.

In my invention the end of the ribbon is secured to a partially cylindrical spring clamp 40, adapted to surround the barrel 41 of either of the spools. This clamp preferably has a kink or double 42 in its surface into which the end of the ribbon extends and by which it is clamped, this kink being caused by bending the clamping piece on itself, as shown in Figs. 1, 11 and 12. The end is secured in the recess provided by this kink by means of short tongues 43 which are cut out of one part of the clamp and passed through the other and are upset on the inner side of the inner portion of the bend. The method of securing the end of the ribbon is not only simple and efficient, but it provides means whereby the same clamp may be used only with its original ribbon, so that a clamp being sold with a genuine ribbon, it is not feasible for a pirating ribbon to be thereafter substituted in the clamp. This I accomplish by making the clamp of sufficiently fragile or brittle material that the lugs 43 and the bend 42 may break when they are once removed from normal position, and will not furnish means for holding a second ribbon. If this spring clamp is made of light spring steel, it is to be understood that the point 45 of the band will be weakened or nearly broken when the ribbon is first installed. Of course, the thickness of the material appearing in Figs. 12 and 13, is much exaggerated for purposes of clearness. It may be that in place of spring steel I can use a hard rubber or composition spring clamp, and I do not wish to be limited to any particular material.

The clamp 40 is provided at one end with an internal edge 47 and at the other with an inwardly projecting arm 48. The barrel 41 of either spool is provided with a longitudinal opening 49 in which the edge 47 takes near its center, and this opening allows the tongue 48 to project into the interior of the barrel, for the purpose of operating the shifting mechanism to be hereinafter described.

The head 50 of the spool is made separate from the rest of the barrel, being preferably screw threaded thereon, as shown in Fig. 4. The spools are held in place by springs 51, which bear against their left hand ends and force them toward the pins 23. A slight pressure on the spool toward the left, however, allows it to be moved sufficiently to release its grasp on the pin 23, wherefore the spool can be taken out. When the head 50 is removed from the spool, the ribbon, wound up on one of the spring clamps 40, may be slipped into place over the end of the spool, the edge 47 and the tongue 48 projecting into the slot 49 extending from the end.

The tongues 48 on the spring clamps are provided at their inner edge with notches 52, which enter the tongue and then turn to leave a projecting portion 51 beneath the notch. Within each spool is an inwardly projecting rigid lip 53 to which is pivoted 55 a bell crank 54. The inner end of this bell crank is connected with a longitudinal central rod 56, which near its outer end slides through a suitable guide, which may be a flanged head 58 within the spool. The bell crank is provided with a pin 59 which is adapted to be engaged by the notch 52 and lie above the projection 51. The studs 23 on which the spools are journaled are tubular, and mounted within them are plungers 64 and 65, which are pressed inwardly by helical springs 66, and are abutted at their inner ends by the rods 56. Now, when the spring clamp is in place, the notch 52 hooks over the pin 59, as shown in Fig. 5. Normally the parts operate after the manner set out, the mechanism within the spools being idle. When, however, one spool becomes empty, the pull on the ribbon occasioned thereby draws outwardly the spring clamp and the tongue 48 pulls on the pin 59 and thereby shoves longitudinally the rod 56, which, acting on the plunger 64 or 65, as the case may be, shoves it outwardly. In such position, this plunger is adapted to engage mechanism to shift the direction of feed, as will now be described.

Pivoted on the end frame member 15 are the two levers 68 and 69. These levers are normally held by springs 80 and 81 above the path of the end of the pin 34, which I have extended toward the frame member. When, however, either pin 64 or 65 is projected, by the corresponding spool becoming empty, it engages the corresponding lever 68 or 69, which engages the pin 34, to shift the driving mechanism. I will now describe this shifting, with particular reference to Figs. 6 to 10. Fig. 6 shows the normal position of the levers 68 and 69. Fig. 7 shows the position of such levers when the rearmost spool, (that is, the left hand one in Fig. 1), has become empty and its pin 65 correspondingly projected. This pin engages a cam face 70 on the lateral head 73 of the lever 68, and forces such head upwardly, bringing the toe 71 of the lever down into the path of the pin 34. As this toe is intercepting the pin 34, the pin 65 comes onto a concentric surface 72 of the lug 73, whereby the movement of rotation may continue, but the pin 34 is retarded. The ribbon feeding mechanism being thus held is shifted by the rotation of the drum to the rear, that is, into the position shown in Fig. 1, where it may drive the empty spool. As soon as it has been shifted somewhat more than half way, so that the spring 38 may insure the balance of the shifting, the pin 65 clears the forward edge 74 of the lug 73, and the lever returns to normal position. The shifting of the feeding mechanism relieves the tension on the full spool so that the spring clamp on the empty spool may return to normal position. Hence, the pin 65 is out of the way of the next rotation. This return of the spring clamp, however, does not take place until after the driving mechanism has been thrown beyond its dead center. When the pin 65 is projected, the lever 69 is entirely idle, as indicated by dotted lines in Fig. 7. Dotted lines in this figure also show the normal position of the lever 68, and the portions of the pins 65 and 34 as they begin to engage. If, on the other hand, the forward spool becomes empty, so that the pin 64 is projected, the shifting is caused by the lever 69, as shown at Fig. 8,—the lever 68 being idle. In this instance, the pin 64 is moving in the same direction in which it is desired to shift the pin 34. The leverage provided is therefore one which increases the movement of the pin 34, instead of retarding it. I provide this by means of a cam lug 76 on the lever 69, the underside of which is engaged by the moving pin 64. This lever is so arranged that when its upper end is raised, the lower end 78 engages on the rear side of the pin 34 and shoves it forward, the movement of this lower end being in excess of the movement of the pin 64, while the face of the portion 78 is at a considerable angle to cam the pin 34 forward. The movement of this lever therefore is to shift the pin 34 in the same direction in which the drum is moving and sufficiently faster than such movement to throw the pin past its dead center so as to change the direction of feeding.

It will be seen from the above description that whenever either spool becomes empty, the driving mechanism is automatically shifted to cause the other spool to be wound in. It is to be understood that the drum normally rotates in one constant direction. I provide, however, against damage should the drum be inadvertently rotated in the wrong direction at a time when either of the pins 64 or 65 is projected outwardly. If the pin 64 were projected, such reverse rotation would cause it to engage the upper surface of the cam lug 76. This would do no harm, as such engagement would simply swing the lever 69 in the direction opposite the normal, a spring 82 being provided to allow this. If such pin 64 engage the lug 73, it would, by reason of its surface 74 and 72, simply slide under the same, raising such lever. The toe of the lever would engage nothing, as the pin 34 is in this instance beyond the levers. If the pin 65 were projected, it would act similarly on the lever 69, but when it came into engagement with the lug 73 on the lever 68, it would force the toe of that lever downwardly so that it might go into the path of the pin 34. To provide for this difficulty, I make the toe 85 of the lever 68 movable. This toe is normally held in place by a spring 86, but it is adapted to be moved to allow the passage of the pin 34 in the usual contingency mentioned, as illustrated in Fig. 9.

Having thus described my invention, I claim:

1. The combination of an inking ribbon, a pair of spools on which its ends are wound, mechanism for driving either spool, mechanism extending within a spool for changing the direction of drive, and a clamp adapted to embrace said spool and also engage the last mentioned mechanism.

2. The combination of an inking ribbon, a pair of spools on which its ends are wound, mechanism for driving either spool, mechanism extending within the spools for changing the direction of drive, and means clamped to the ribbon for operating such mechanism and comprising a spring member adapted to embrace the spool and having an inwardly projecting tongue adapted to be connected with the last mentioned mechanism.

3. The combination with a pair of spools, means for driving them, and a ribbon having secured, to each end, a clamp adapted to embrace a spool, and mechanism operated by said clamp for changing the direction of the feed.

4. The combination of a ribbon spool, a spring clamp adapted to embrace the spool and to be secured to the end of a ribbon, mechanism for driving the spool, and means operated by said clamp for reversing the direction of drive.

5. The combination with a ribbon spool, of means including a longitudinally shiftable rod extending into the interior of the spool for changing the direction of the drive of the ribbon, and means connected with the ribbon for anchoring the end of the ribbon and operating such interior means by the pull of the unwound ribbon.

6. The combination of a pair of ribbon spools, mechanism for rotating each spool, a pair of levers beyond the end of the spools for shifting the rotating mechanism from either spool to the other, and mechanism connected with the ribbon for operating said levers.

7. The combination with a ribbon and a ribbon feeding mechanism, of a spring clamp secured to the ribbon and adapted to control the feeding mechanism, and also provide the anchor for the ribbon.

8. The combination with a ribbon and a ribbon feeding mechanism of reversing mechanism, and a spring member secured to the ribbon, a spool, and means within it adapted to be engaged by said spring member and adapted to control the reversing mechanism.

9. The combination with a ribbon and a ribbon feeding mechanism, of a spring clamp connected with the ribbon and adapted to control the feeding mechanism, said clamp being secured to the ribbon by a frangible connection.

10. The combination with ribbon reversing mechanism, of a spring clamp secured to the end of a ribbon for controlling such mechanism, and embracing the ribbon spool.

11. The combination with a ribbon, of a securing device therefor comprising a spring clamp adapted to embrace a spool barrel and having an inwardly projecting tongue adapted to enter a slot in the barrel, the ribbon being secured to the clamp adjacent to said tongue.

12. The combination, with a spool having a slot, of a spring metal clamp formed to lie against the outside of the spool and having an inwardly projecting portion and means for securing a ribbon both formed of the metal of the clamp adjacent to the same edge thereof.

13. The combination with a ribbon, of means for securing the same to a slotted spool comprising a clamp formed to lie against the outside of such spool and having an inwardly projecting portion to enter such slot, the clamp adjacent to such inwardly projecting portion being doubled on itself onto opposite sides of the end of the ribbon, said doubled portion and inwardly projecting portion being formed of material at the same edge of the clamp.

14. A device for holding a fabric to a longitudinally slotted spool comprising a single piece of spring sheet-metal curved to lie against the outside of the spool and having an inwardly projecting portion adapted to enter such slot and having a portion adjacent to the inward projection doubled on itself to clamp the end of the fabric, the said double portion and the inward projection being adjacent to the same edge of the metal.

In testimony whereof, I hereunto affix my signature in the presence of two witnesses.

ALBERT H. BATES.

Witnesses:
  W. L. McGarrell,
  Brennan B. West.